(12) United States Patent
Tang (10) Patent No.: US 11,140,685 B2
(45) Date of Patent: Oct. 5, 2021

(54) COMMUNICATION METHOD, NETWORK DEVICE AND USER EQUIPMENT

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 71 days.

(21) Appl. No.: 16/317,321

(22) PCT Filed: Aug. 12, 2016

(86) PCT No.: PCT/CN2016/094818
§ 371 (c)(1),
(2) Date: Jan. 11, 2019

(87) PCT Pub. No.: WO2018/010243
PCT Pub. Date: Jan. 18, 2018

(65) Prior Publication Data
US 2019/0246389 A1 Aug. 8, 2019

(30) Foreign Application Priority Data
Jul. 14, 2016 (WO) ............... PCT/CN2016/090024

(51) Int. Cl.
*H04W 8/24* (2009.01)
*H04W 72/04* (2009.01)
(Continued)

(52) U.S. Cl.
CPC .......... *H04W 72/048* (2013.01); *H04W 8/24* (2013.01); *H04W 72/042* (2013.01);
(Continued)

(58) Field of Classification Search
CPC ..... H04W 72/04; H04W 88/08; H04W 74/00; H04W 72/048; H04W 8/24;
(Continued)

(56) References Cited

U.S. PATENT DOCUMENTS 7,225,384 B2 * 5/2007 Heo ...................... H04L 1/0051
714/749
7,647,047 B2 * 1/2010 Moghaddam ......... H04W 12/08
455/434
(Continued)

FOREIGN PATENT DOCUMENTS

CN 101248692 A 8/2008
CN 101729227 A 6/2010
(Continued)

OTHER PUBLICATIONS

First Office Action of the Russian application No. 2019104031, dated Dec. 4, 2019.
(Continued)

*Primary Examiner* — Hassan A Phillips
*Assistant Examiner* — Prenell P Jones (57) ABSTRACT

Provided are a communication method, a network device and a User Equipment (UE), which can improve communication performance. The method includes that: a UE generates processing time information, the processing time information indicating a UE processing time supported by the UE; and the UE transmits the processing time information to a network device.

12 Claims, 3 Drawing Sheets

300

A network device transmits an indication message to a UE, the indication message is configured to instruct the UE to report one or more UE processing times supported by the UE — S301

The network device receives processing time information from the UE, the processing time information indicating the one or more UE processing time supported by the UE — S302

(51) Int. Cl.
    *H04W 72/12*     (2009.01)
    *H04W 28/18*     (2009.01)
(52) U.S. Cl.
    CPC ........ *H04W 72/0413* (2013.01); *H04W 28/18* (2013.01); *H04W 72/1284* (2013.01)
(58) Field of Classification Search
    CPC ........... H04W 72/0413; H04W 72/042; H04W 72/1284; H04W 28/18
    See application file for complete search history.

(56) References Cited

U.S. PATENT DOCUMENTS

| | | | |
|---|---|---|---|
| 8,675,692 | B2 | 3/2014 | Park |
| 10,593,361 | B2* | 3/2020 | Cottinet .................... H04L 7/04 |
| 2004/0042492 | A1 | 3/2004 | Suzuki |
| 2004/0093548 | A1* | 5/2004 | Heo ..................... H04L 1/0072 714/749 |
| 2006/0126558 | A1* | 6/2006 | Lee ....................... H04W 36/14 370/329 |
| 2007/0026881 | A1 | 2/2007 | Tzavidas |
| 2010/0153532 | A1* | 6/2010 | Ozawa ................ H04L 41/0813 709/223 |
| 2011/0032850 | A1 | 2/2011 | Cai |
| 2011/0090810 | A1* | 4/2011 | Park ..................... H04L 1/1854 370/252 |
| 2011/0124313 | A1* | 5/2011 | Jones ...................... H04W 8/18 455/406 |
| 2011/0202616 | A1* | 8/2011 | Kinoshita ............... H04L 51/30 709/206 |
| 2012/0331479 | A1* | 12/2012 | Takagi ..................... G06F 9/505 718/105 |
| 2014/0321291 | A1* | 10/2014 | Chen .................. H04L 41/0803 370/241 |
| 2015/0117278 | A1 | 4/2015 | Song et al. |
| 2015/0172017 | A1* | 6/2015 | Wu ........................ H04L 5/001 370/329 |
| 2015/0180416 | A1* | 6/2015 | Fernandez ........... H03D 7/1466 455/326 |
| 2015/0188670 | A1 | 7/2015 | Lee et al. |
| 2015/0365931 | A1* | 12/2015 | Ng ........................ H04L 1/1893 370/329 |
| 2016/0043841 | A1* | 2/2016 | Lunttila ................ H04L 5/0092 370/280 |
| 2016/0366722 | A1* | 12/2016 | Heo ..................... H04B 17/318 |
| 2017/0208568 | A1* | 7/2017 | Nam ..................... H04L 5/0094 |
| 2017/0223648 | A1* | 8/2017 | Shin ..................... H04J 11/0073 |
| 2018/0130492 | A1* | 5/2018 | Cottinet .................... H04L 7/04 |
| 2018/0302820 | A1* | 10/2018 | Heo ..................... H04L 65/608 |
| 2019/0208525 | A1* | 7/2019 | Xue .................. H04W 72/0453 |
| 2019/0342864 | A1* | 11/2019 | Hwang ................. H04L 5/0053 |

FOREIGN PATENT DOCUMENTS

| | | |
|---|---|---|
| CN | 101807984 A | 8/2010 |
| CN | 102638333 A | 8/2012 |
| CN | 102916792 A | 2/2013 |
| CN | 103634081 A | 3/2014 |
| CN | 104247543 A | 12/2014 |
| CN | 104519583 A | 4/2015 |
| CN | 105634686 A | 6/2016 |
| EP | 2704495 A2 | 3/2014 |
| JP | 103580836 A | 2/2014 |
| JP | 2015508265 A | 3/2015 |
| JP | 2015162777 A | 9/2015 |
| JP | 2015536097 A | 12/2015 |
| RU | 2584479 C1 | 5/2016 |
| WO | 2007014025 A2 | 2/2007 |
| WO | 2012042627 A1 | 4/2012 |
| WO | 2013123980 A1 | 8/2013 |
| WO | 2015044771 A2 | 4/2015 |
| WO | 2016004634 A1 | 1/2016 |

OTHER PUBLICATIONS

Supplementary European Search Report in the European application No. 16908568.5, dated Apr. 25, 2019.
English translation of the Written Opinion of the International Search Authority in international application No. PCT/CN2015/090024, dated Mar. 31, 2017.
English translation of the Written Opinion of the International Search Authority in international application No. PCT/CN2016/094818, dated Mar. 31, 2017.
First Office Action of the Canadian application No. 3030597, dated Nov. 28, 2019.
First Office Action of the Chinese application No. 201680087543.9, dated Mar. 12, 2020.
Written Opinion of the Singaporean application No, 11201900303X, dated Mar. 20, 2020.
Notice of Allowance of the Russian application No. 2019104031, dated Mar. 20, 2020.
International Search Report in international application No. PCT/CN2016/094818, dated Mar. 31, 2017.
Written Opinion of the International Search Authority in international application No. PCT/CN2016/094818, dated Mar. 31, 2017.
International Search Report in international application No. PCT/CN2016/090024, dated Mar. 31, 2017.
Written Opinion of the International Search Authority in international application No. PCT/CN2016/090024, dated Mar. 31, 2017.
"5GMF White Paper" 5G Mobile Communications Systems for 2020 and beyond, May 30, 2016(May 30, 2016), the whole document.
Samsung, Framework for multiplexing verticals in NR, 3GPP TSG WG1#85 R1-164001, May 13, 2016.
LG Electronics, Initial Evaluation Result for NR Numerology, 3GPP TSG-RAN WG1#85 R1-165431, May 20, 2016.
Second Office Action of the Chinese application No. 201680087543.9, dated Jun. 9, 2020.
Decision of Refusal of the Chinese application No. 201680087543.9, dated Sep. 1, 2020.
First Office Action of the Indian application No. 201917005286, dated Aug. 28, 2020.
First Office Action of the Japanese application No. 2019-500795, dated Aug. 11, 2020.
Samsung, "Design aspects of URLLC for NR", 3GPP TSG RAN WG1 Meeting #85 R1-164002 Nanjing, China May 23-27, 2016.
First Office Action of the Brazilian application No. 1120190006486, dated Sep. 1, 2020.
Second Office Action of the Canadian application No. 3030597, dated Sep. 21, 2020.
First Office Action of the European application No. 16908568.5, dated Nov. 9, 2020.
First Office Action of the Australian application No. 2016414485, dated Apr. 12, 2021.
Second Office Action of the Japanese application No. 2019-500795, dated Feb. 9, 2021.
Notice of Review of the Chinese application No. 201680087543.9, dated Apr. 1, 2021.
Ericsson, "Additional system level results for short TTI and different processing times", 3GPP TSG-RAN WG1 #85 R1-165303, Nanjing, P.R. China, May 23-27, 2016.
Samsung, "Discussion on processing time for TTI shortening", 3GPP TSG RAN WG1 Meeting #85 R1-164797, Nanjing, China, May 23-27, 2016.
First Office Action of the Taiwanese application No. 106122651, dated Apr. 27, 2021.
Notice of Rejection of the Japanese application No. 2019-500795, dated Jun. 22, 2021.
Notice of Review Decision of the Chinese application No. 201680087543.9, dated Jun. 25, 2021.

* cited by examiner

COMMUNICATION METHOD, NETWORK DEVICE AND USER EQUIPMENT

CROSS-REFERENCE TO RELATED APPLICATION

The present application claims priority to PCT Patent Application No. PCT/CN2016/090024, filed to China Patent Office on Jul. 14, 2016, entitled "Communication Method, Base Station and User Equipment", the contents of which are hereby incorporated by reference in its entirety.

TECHNICAL FIELD

The disclosure relates to the field of communications, and in particular to a communication method, a network device, and a User Equipment (UE).

BACKGROUND

In an existing mobile communication system, after a base station allocates an uplink resource to a UE, the UE needs to take a certain processing time, and then uses the uplink resource to transmit data. For example, in a Long Term Evolution (LTE) system, the base station allocates an uplink resource to the UE at a subframe time n, and the UE uses the allocated uplink resource for uplink data transmission at a subframe n+4. In the LTE system, the duration of a subframe is 1 ms, so that a UE processing time in the LTE system is 3 ms. In other words, a processing time required for data transmitting by the UE cannot be less than 3 ms. In the LTE system, not only an uplink scheduling time is in the form of n+4, but also an uplink retransmission preparation time is also in the form of n+4. Therefore, the scheduling timing of the system is closely related to the UE processing time. It is generally considered in the prior art that the processing time of different UEs is a fixed value (such as 3 ms), and system scheduling is performed based thereon.

With the development of communication technologies, e.g., in a 5th Generation (5G) system, numerologies of different UEs may be different from each other, highest UE categories supported by different UEs may be different, processing capabilities of different UEs may also be different, and the above situation may cause different UE processing time between different UEs or different UE processing time under different configurations of the same UE, thereby affecting system scheduling.

SUMMARY

The disclosure provides a communication method, a network device and a UE, intended to improve the communication performance.

A first aspect provides a communication method, including that: a UE generates processing time information, the processing time information indicating one or more UE processing times supported by the UE; and the UE transmits the processing time information to a network device.

In the embodiments of the disclosure, a UE reports processing time information to a network device, the processing time information may indicate one or more UE processing times supported by the UE, so that the network device performs scheduling or other operations on a system based on the processing time information, thereby improving the communication performance.

In combination with the first aspect, in a first possible implementation manner of the first aspect, the processing time information includes a minimum UE processing time supported by the UE.

In combination with the first aspect or the first possible implementation manner of the first aspect, in a second possible implementation manner of the first aspect, the UE supports at least one UE processing time level, the at least one UE processing time level has a correspondence with at least one UE processing time range, and the processing time information includes at least one UE processing time level supported by the UE.

In combination with the second possible implementation manner of the first aspect, in a third possible implementation manner of the first aspect, the processing time information includes a UE processing time level corresponding to a minimum UE processing time supported by the UE.

In combination with the second or third possible implementation manner of the first aspect, in a fourth possible implementation manner of the first aspect, the communication method further includes that: the UE receives notification information from the network device, the notification information indicating a correspondence between at least one UE processing time level and at least one UE processing time range.

In combination with any one of the foregoing possible implementation manners, in a fifth possible implementation manner of the first aspect, before the UE generates processing time information, the communication method further includes that: the UE receives an indication message from the network device, the indication message being configured to instruct the UE to report one or more UE processing times supported by the UE.

In combination with the first aspect, in a sixth possible implementation manner of the first aspect, the processing time information includes a UE processing time corresponding to a target parameter, the target parameter being at least one of the following parameters: a target UE category, a target numerology or a target carrier bandwidth, and the UE processing time being time required for data processing in case that the UE configures the target parameter.

In the embodiments of the disclosure, a UE reports processing time information to a network device, wherein the processing time information may indicate a UE processing time corresponding to a target parameter supported by the UE, so that the network device performs scheduling or other operations on a system based on the processing time information, thereby improving the communication performance.

In combination with the sixth possible implementation manner of the first aspect, in a seventh possible implementation manner of the first aspect, before the UE generates processing time information, the communication method further includes that: the UE receives an indication message from the network device, the indication message including first information configured to instruct the UE to report a UE processing time corresponding to the target parameter.

In combination with the sixth or seventh possible implementation manner of the first aspect, in an eighth possible implementation manner of the first aspect, the processing time information includes a UE processing time corresponding to a combination of target parameters, the combination of target parameters including at least two of the following parameters: the target UE category, the target numerology, or the target carrier bandwidth.

In combination with the seventh or eighth possible implementation manner of the first aspect, in a ninth possible implementation manner of the first aspect, the indication message includes second information, the second information being configured to instruct the UE to report a UE processing time corresponding to a UE category that is less than or equal to a highest UE category; the operation that the UE generates processing time information includes that: the UE determines a UE category that is less than or equal to the highest UE category from UE categories supported by the UE; the UE determines the UE category that is less than or equal to the highest UE category as the target UE category; and the UE generates the processing time information according to a UE processing time corresponding to the target UE category.

In combination with any one of the sixth to ninth possible implementation manners of the first aspect, in a tenth possible implementation manner of the first aspect, the target numerology is M numerologies, and the processing time information includes a UE processing time corresponding to the target UE category in each of the M numerologies.

In combination with any one of the sixth to tenth possible implementation manners of the first aspect, in an eleventh possible implementation manner of the first aspect, the target carrier bandwidth is N carrier bandwidths, and the processing time information includes a UE processing time, for each of the N carrier bandwidths, corresponding to the target UE category.

A second aspect provides a communication method, including that: a network device transmits an indication message to a UE, the indication message being configured to instruct the UE to report one or more UE processing times supported by the UE; and the network device receives processing time information from the UE, the processing time information indicating one or more UE processing times supported by the UE.

In the embodiments of the disclosure, the network device instructs the UE to report processing time information, the processing time information may indicate one or more UE processing times supported by the UE, so that the network device performs scheduling or other operations on a system based on the processing time information, thereby improving the communication performance.

In combination with the second aspect, in a first possible implementation manner of the second aspect, the processing time information includes a minimum UE processing time supported by the UE.

In combination with the second aspect or the first possible implementation manner of the second aspect, in a second possible implementation manner of the second aspect, the UE supports at least one UE processing time level, the at least one UE processing time level has a correspondence with at least one UE processing time range, and the processing time information includes at least one UE processing time level supported by the UE.

In combination with the second possible implementation manner of the second aspect, in a third possible implementation manner of the second aspect, the processing time information includes a UE processing time level corresponding to a minimum UE processing time supported by the UE.

In combination with the second or third possible implementation manner of the second aspect, in a fourth possible implementation manner of the second aspect, the communication method further includes that: the network device transmits notification information to the UE, the notification information indicating a correspondence between at least one UE processing time level and at least one UE processing time range.

In combination with the second aspect, in a fifth possible implementation manner of the second aspect, the processing time information includes a UE processing time corresponding to a target parameter, the target parameter being at least one of the following parameters: a target UE category, a target numerology or a target carrier bandwidth, and the UE processing time being time required for data processing in case that the UE configures the target parameter.

In the embodiments of the disclosure, the network device instructs the UE to report processing time information, wherein the processing time information may indicate a UE processing time corresponding to a target parameter supported by the UE, so that the network device performs scheduling or other operations on a system based on the processing time information, thereby improving the communication performance.

In combination with the fifth possible implementation manner of the second aspect, in a sixth possible implementation manner of the second aspect, the indication message includes first information, the first information being configured to instruct the UE to report a UE processing time corresponding to the target parameter.

In combination with the fifth or sixth possible implementation manner of the second aspect, in a seventh possible implementation manner of the second aspect, the processing time information includes a UE processing time corresponding to a combination of target parameters, the combination of target parameters including at least two of the following parameters: the target UE category, the target numerology, or the target carrier bandwidth.

In combination with any one of the fifth to seventh possible implementation manners of the second aspect, in an eighth possible implementation manner of the second aspect, the indication message includes second information, the second information being configured to instruct the UE to report a UE processing time corresponding to a UE category that is less than or equal to a highest UE category.

In combination with any one of the fifth to eighth possible implementation manners of the second aspect, in a ninth possible implementation manner of the second aspect, the target numerology is M numerologies, and the processing time information includes a UE processing time, for each of the M numerologies, corresponding to the target UE category.

In combination with any one of the fifth to eighth possible implementation manners of the second aspect, in a tenth possible implementation manner of the second aspect, the target carrier bandwidth is N carrier bandwidths, and the processing time information includes a UE processing time, for each of the N carrier bandwidths, corresponding to the target UE category.

A third aspect provides a UE, including: a generation module, configured to generate processing time information, the processing time information indicating one or more UE processing times supported by the UE; and a transmitting module, configured to transmit the processing time information to a network device.

A fourth aspect provides a network device, including: a transmitting module, configured to transmit an indication message to a UE, the indication message being configured to instruct the UE to report one or more UE processing times supported by the UE; and a receiving module, configured to receive processing time information from the UE, the processing time information indicating one or more UE processing times supported by the UE.

A fifth aspect provides a UE, including: a memory, configured to store a program; a transceiver, configured to communicate with other devices; and a processor, configured to execute the program in the memory, wherein when the program is executed, the processor is configured to: generate processing time information, the processing time information indicating one or more UE processing times supported by the UE; and transmit the processing time information to a network device through the transceiver.

A sixth aspect provides a network device, including: a memory, configured to store a program; a transceiver, configured to communicate with other devices; and a processor, configured to execute the program in the memory, wherein when the program is executed, the processor is configured to: transmit an indication message to a UE through the transceiver, the indication message being configured to instruct the UE to report one or more UE processing times supported by the UE; and receive processing time information from the UE through the transceiver, the processing time information indicating one or more UE processing times supported by the UE.

A seventh aspect provides a computer chip, including: an input interface, an output interface, at least one processor, and a memory. The processor is configured to execute code in the memory. When the code is executed, the processor may implement various processes performed by a UE in the communication method in the foregoing first aspect and various implementation manners.

An eighth aspect provides a computer chip, including: an input interface, an output interface, at least one processor, and a memory. The processor is configured to execute code in the memory. When the code is executed, the processor may implement various processes performed by a network device in the communication method in the foregoing second aspect and various implementation manners.

A ninth aspect provides a computer-readable storage medium. The computer-readable storage medium stores a program. The program enables a UE to perform any one communication method in the first aspect and various implementation manners thereof.

A tenth aspect provides a computer-readable storage medium. The computer-readable storage medium stores a program. The program enables a network device to perform any one communication method in the second aspect and various implementation manners thereof.

BRIEF DESCRIPTION OF DRAWINGS

In order to more clearly illustrate the technical solutions of the embodiments of the disclosure, the drawings to be used in the embodiments of the disclosure will be briefly introduced below. It is apparent that the drawings described below are only some embodiments of the disclosure. Ordinary skill in the art can also obtain other drawings based on these drawings without paying any creative work.

DETAILED DESCRIPTION

The technical solutions in the embodiments of the disclosure are clearly and completely described below in combination with the accompanying drawings in the embodiments of the disclosure. It is apparent that the described embodiments are a part of the embodiments of the disclosure, and not all embodiments. All other embodiments obtained by those of ordinary skill in the art based on the embodiments of the disclosure without paying any creative work shall fall within the scope of protection of the disclosure.

It is to be understood that the technical solutions of the embodiments of the disclosure may be applied to various communication systems such as a Global System of Mobile communication (GSM) system, a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD), a Universal Mobile Telecommunication System (UMTS), or a Worldwide Interoperability for Microwave Access (WiMAX) communication system, a 5G system, or a New Radio (NR) system.

In the embodiments of the disclosure, the terms "network" and "system" are often used interchangeably, but those skilled in the art can understand the meaning thereof. The UE involved in the embodiments of the disclosure may include various handheld devices, in-vehicle devices, wearable devices and computing devices having a wireless communication function, or other processing devices connected to a wireless modem, and various forms of UEs, Mobile Stations (MSs), terminals, terminal devices, and the like. For convenience of description, in the embodiments of the disclosure, the devices mentioned above are collectively called UEs.

The network device in the embodiments of the disclosure may be a device for communicating with a terminal device. The network device may be a Base Transceiver Station (BTS) in a GSM or a CDMA, or a NodeB (NB) in a WCDMA system, or an Evolutional NodeB (eNB or eNodeB) in an LTE system, or a wireless controller in a Cloud Radio Access Network (CRAN) scenario. Or, the network device may be a relay station, an access point, an in-vehicle device, a wearable device, and a network device in a future 5G network or a network device in a future evolved Public Land Mobile Network (PLMN). The embodiments of the disclosure are not limited.

Figure 1:
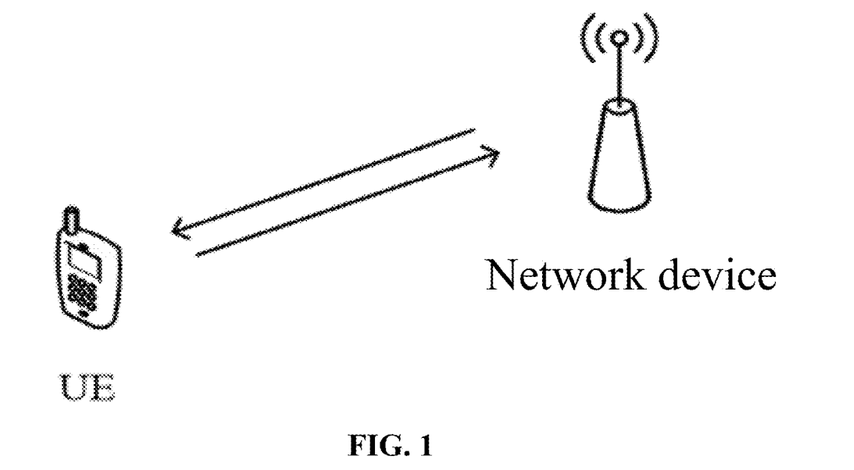
FIG. 1 is a schematic diagram of an application scenario according to an embodiment of the disclosure.

FIG. 1 is a schematic diagram of an application scenario of a communication method according to an embodiment of the disclosure. As shown in FIG. 1, the application scenario may include a network device and a UE, wherein the network device and the UE may communicate through a wireless link.

In order to improve communication performance, the disclosure provides a communication method, a network device and a UE. It may be used to transmit one or more UE processing times supported by the UE to the network device, so that the network device performs system scheduling or other related operations according to the reported UE processing time, and the communication performance can be improved.

Figure 2:
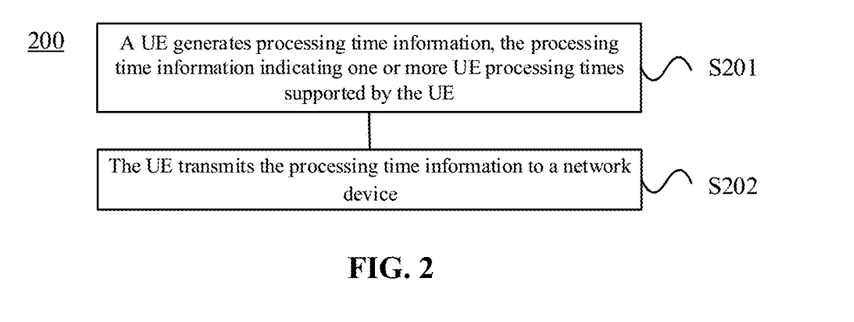
FIG. 2 is a schematic diagram of a communication method according to an embodiment of the disclosure.

FIG. 2 shows a communication method 200 according to an embodiment of the disclosure. The method 200 may be performed by a UE. The method 200 includes the following operations.

At S201, a UE generates processing time information, the processing time information indicating one or more UE processing times supported by the UE.

The UE processing time may be time required for the UE to process data during the communication process. For example, the UE processing time may be time for preparing data uplink transmission after the UE receives an uplink scheduling instruction of the network device; or the UE processing time may be time for completing downlink data reception (completing channel decoding) after the UE receives a downlink scheduling indication of the network device.

Alternatively, in the embodiment of the disclosure, the UE may directly report the one or more UE processing times supported by the UE, or may report one or more levels corresponding to the one or more UE processing times supported by the UE. For example, at least one UE processing time level may be defined, and the at least one UE processing time level may have a correspondence with at least one UE processing time range. The UE may report the UE processing time level corresponding to the UE processing time range covering the UE processing time(s) supported by the UE. The network device may notify the UE of the manner of classifying the UE processing time levels by means of signaling (such as dedicated signaling or broadcast signaling), or the network device may preset the manner of classifying the UE processing time levels in a protocol with the UE.

Alternatively, the UE may report a minimum UE processing time supported by the UE through the processing time information, or may report at least one UE processing time supported by the UE. The UE may report a UE processing time level corresponding to a minimum UE processing time supported by the UE through the processing time information, or may report at least one UE processing time level supported by the UE. The UE processing time level corresponding to the minimum UE processing time may be a UE processing time level corresponding to a UE processing time range covering the minimum UE processing time. Those skilled in the art can understand that if the UE can support a certain UE processing time level, the UE can support another UE processing time level lower than the UE processing time level.

Alternatively, in the embodiment of the disclosure, the UE may also report the processing time information according to a processing time corresponding to a target parameter supported by the UE, the target parameter being at least one of the following parameters: a target UE category, a target numerology or a target carrier bandwidth, and the UE processing time being time required for data processing in case that the UE configures the target parameter.

Alternatively, the target parameter may be any one of a target UE category, a target numerology or a target carrier bandwidth, or may be any combination of the parameters. The target UE category, the target numerology and the target carrier bandwidth may be some UE categories, some numerologies and some carrier bandwidths supported by the UE, or all UE categories, all numerologies and target carrier bandwidths supported by the UE. The embodiment of the disclosure does not make any limitation on this. The UE transmits the processing time information to the network device, so that the network device schedules the UE or the system according to the UE processing time corresponding to the target parameter, or may perform other related operations according to the UE processing time.

Alternatively, the above UE category may be the UE category. It is to be noted that in a communication system, the UE category may be used to define a maximum uplink and downlink transmission rate that can be supported by the UE. Or, the UE category is used to classify the terminal rates (levels) of the UE. A given UE category is related to a certain Carrier Aggregation (CA), Multiple-Input Multiple-Out (MIMO) and highest modulation (such as 64QAM and 256QAM). The above CA, MIMO and highest modulation may all affect the size of the processing time of the UE. Therefore, the UE processing time corresponding to different levels of UE categories is different. In addition, as the UE category is higher, the maximum uplink and downlink transmission rate that can be supported is higher. For example, if the highest UE category of a UE is N, all rates from UE category 1 to UE category N can be supported, and the highest rate that can be supported is determined by UE category N. In addition, it is to be noted that UE category 0 is also written in the standard of 3GPP Rel. 12, which can be dedicated to the Internet of Things and is used to indicate the maximum uplink and downlink transmission rate of a Machine Type Communication (MTC).

Furthermore, in addition to the above CA, MIMO and highest modulation, the UE processing time is affected by many other factors. For example, in the 5G discussion, numerologies corresponding to different UEs may be different, or the same UE may support multiple numerologies, and different numerologies may also affect the size of the UE processing time. The numerology may also be called a basic parameter set, which may be the most basic parameters of a communication system (such as a cellular system). For example, for an LTE system or a 5G system, the numerology may include a subcarrier spacing, a symbol duration and the like of the system. The subcarrier spacing and the symbol width may also affect the size of the processing time. In other words, for different numerologies supported by the UE, the UE processing time corresponding to the same UE category may also be different.

In addition, carrier bandwidths supported by different UEs may be different, or the same UE may support multiple carrier bandwidths, and carrier bandwidths supported by the UE may be different, which may also affect the size of the UE processing time.

At S202, the UE transmits the processing time information to a network device.

In the embodiments of the disclosure, the UE reports processing time information to the network device, the processing time information may indicate one or more UE processing times supported by the UE, so that the network device performs scheduling or other operations on a system based on the processing time information, thereby improving the communication performance.

Alternatively, in the method 200, the processing time information includes a minimum UE processing time supported by the UE.

In the embodiments of the disclosure, the UE may directly report the minimum UE processing time supported by the UE to the network device, so that the network device performs related scheduling or other operations, thereby improving the communication performance.

Alternatively, in the method 200, the UE supports at least one UE processing time level, the at least one UE processing time level has a correspondence with at least one UE processing time range, and the processing time information includes at least one UE processing time level supported by the UE.

Alternatively, in the method 200, the UE supports at least one UE processing time level, the at least one UE processing time level has a correspondence with at least one UE processing time range, and the processing time information includes a UE processing time level corresponding to a minimum UE processing time supported by the UE.

For example, the processing time of the UE may be classified into three levels:

Level 1: 3 ms and above;
Level 2: 0.5 ms to 3 ms;
Level 3: 0.1 ms to 0.5 ms.

If the minimum UE processing time that can be supported by the UE is 0.3 ms, a level corresponding to the minimum UE processing time is 3. It is indicated that the UE can support three UE processing time levels namely Level 1, Level 2, and Level 3. The UE may indicate, in the processing time information, that UE processing time levels supported by the UE are Level 1, Level 2, and Level 3. Or, the UE may indicate, in the processing time information, that the UE processing time level corresponding to the minimum UE processing time supported by the UE is Level 3.

Figure 3:
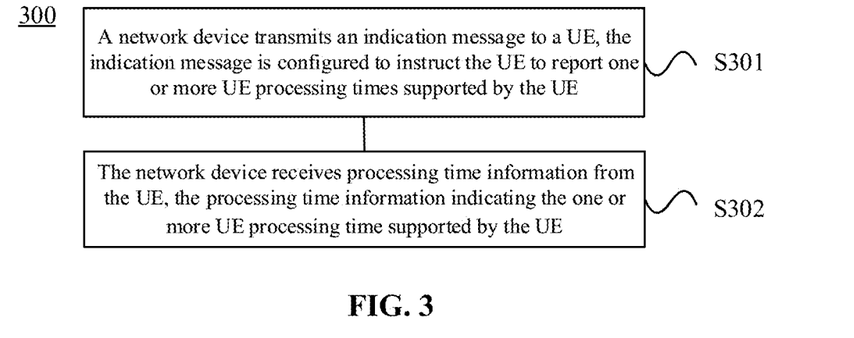
FIG. 3 is a schematic diagram of a communication method according to another embodiment of the disclosure.

Alternatively, the UE may preset a manner of classifying the UE processing time levels by using a protocol with the network device, or may notify the UE of a manner of classifying the UE processing time levels by the network device. For example, in the method 300, the UE may receive notification information from the network device, the notification information indicating a correspondence between at least one UE processing time level and at least one UE processing time range. Alternatively, the notification information may be dedicated signaling or broadcast signaling.

Alternatively, the UE may actively report the processing time information to the network device. For example, the UE may report the processing time information to the network device when the base station/network is accessed for the first time, and the UE may report the processing time information after the network device instructs the UE to report the UE processing time.

For example, the method 300 further includes the following operations.

At S203, before the UE generates the processing time information, the UE receives an indication message from the network device, the indication message being configured to instruct the UE to report one or more UE processing times supported by the UE.

In the embodiments of the disclosure, the UE may receive an indication message from the network device, the indication message being configured to instruct the UE to report the supported UE processing time, thereby improving the communication performance.

Further, the indication message may indicate a manner in which the UE reports the UE processing time. For example, the indication message may instruct the UE to report a minimum UE processing time supported by the UE, or instruct the UE to report a UE processing time level corresponding to the minimum UE processing time supported by the UE, or instruct the UE to report at least one UE processing time level supported by the UE. The embodiment of the disclosure does not make any limitation on this.

Alternatively, the UE may also report a UE processing time according to a target parameter supported by the UE. For example, in the method 300, the processing time information reported by the UE may further include the UE processing time corresponding to the target parameter, the target parameter being at least one of the following parameters: a target UE category, a target numerology or a target carrier bandwidth, and the UE processing time being time required for data processing in case that the UE configures the target parameter.

In the embodiments of the disclosure, the UE reports processing time information to the network device, the processing time information may indicate a UE processing time corresponding to the target parameter supported by the UE, so that the network device performs scheduling or other operations on a system based on the processing time information, thereby improving the communication performance.

Alternatively, the method 200 further includes the following operations.

At S204, before the UE generates the processing time information, the UE receives an indication message from the network device, the indication message including first information configured to instruct the UE to report a UE processing time corresponding to the target parameter.

In the embodiments of the disclosure, the UE may receive an indication message from the network device, and first information included in the indication message may be used to instruct the UE to report a UE processing time corresponding to a target parameter, thereby improving the communication performance.

Alternatively, the indication message may be used to instruct the UE to report the UE processing time(s) supported by the UE.

In the embodiments of the disclosure, the network device may configure a manner in which the UE reports the UE processing time by the indication message, or the network device may instruct the UE to report the UE processing time corresponding to specific target parameters or specific combination of target parameters. The UE may generate processing time information based on the indication message, and transmit the processing time information to the network device.

Alternatively, as an embodiment, the processing time information includes a UE processing time corresponding to a combination of target parameters, the combination of target parameters including at least two of the following parameters: the target UE category, the target numerology, or the target carrier bandwidth.

Alternatively, as an embodiment, the network device may indicate, in the indication message, the range of the UE category, the numerology and/or the carrier bandwidth reported by the UE. For example, the network device may indicate UE category 3, UE category 5 and UE category 7 in the indication message, and the UE may merely report the UE processing time corresponding to the three UE categories to the network device by the processing time information. For example, the network device may configure a list of UE categories for the UE, and the UE may merely report UE processing times corresponding to the UE categories included in the list. The network device may transmit the list through the indication message. It should be understood that the highest UE category that can be supported by the UE may exceed the highest UE category that the network device requires the UE to report. However, when the highest UE category that the network device requires the UE to report exceeds the UE category that can be supported by the UE, the UE may merely report the UE processing time corresponding to the UE category that can be supported by the UE. Similarly, the range of the numerology or carrier bandwidth supported by the UE may exceed the range that the network device requires the UE to report. However, when the range of the numerology or carrier bandwidth that the network device requires the UE to report exceeds the range supported by the UE, the UE may merely report the UE processing time corresponding to the numerology or carrier bandwidth supported by the UE.

Alternatively, as an embodiment, the indication message may include second information, the second information being configured to instruct the UE to report a UE processing time corresponding to a UE category that is less than or equal to a highest UE category. After receiving the indication message, the UE may determine, from the UE categories supported by the UE, a UE category that is less than or equal to the highest UE category, determine the UE category that is less than or equal to the highest UE category as the target UE category, and then generate processing time information. For example, the network device may configure the UE to report different UE processing times corresponding to UE category 1 to UE category N. For example, if the highest UE category required to be reported by the network device is UE category 7, the UE will report different UE processing times corresponding to UE category 1 to UE category 7.

Alternatively, as an embodiment, the target numerology may be M numerologies, and the processing time information may include a UE processing time, for each of the M numerologies, corresponding to the target UE category, where M≥1.

It is to be noted that the numerology may include the most basic parameters of a communication system (such as a cellular system). For example, for an LTE system or a 5G system, the numerology may include a subcarrier spacing, a symbol duration and the like of the system.

In the embodiments of the disclosure, the UE reports, through the processing time information, the UE processing time corresponding to the combination of different numerologies and the target UE category configured by the UE, so that the network device performs system scheduling or other operations according to the processing time information, thereby improving the communication performance.

The above M numerologies may be all of the numerologies supported by the UE, or may be some of the numerologies supported by the UE.

Alternatively, the network device may instruct the UE to report a UE processing time, for each of the M numerologies, corresponding to the target UE category. The indication may be included in an indication message, or may be included in other information.

For example, Table 1 indicates a manner in which the UE reports the UE processing time to the network device, and the UE may transmit the processing time information to the network device according to Table 1. Table 1 may be preconfigured for the UE by the network device. For example, the network device may indicate, to the UE by the indication information, that the UE is expected to report the range of the combination of the numerology and the target UE category. The UE may report the UE processing times, for all of the numerologies supported by the UE, corresponding to the target UE category, to the network device, or the UE may report the UE processing times, for some of the numerologies supported by the UE, corresponding to the target UE category, to the network device.

TABLE 1

| Numerology | Target UE category | UE processing time |
|---|---|---|
| Numerology 1 | UE category i | |
| | . . . | |
| | UE category j | |
| Numerology 2 | UE category m | |
| | . . . | |
| | UE category n | |
| . . . | . . . | . . . |

Alternatively, as an embodiment, the target carrier bandwidth may include N carrier bandwidths, and the processing time information may include a UE processing time, for each of the N carrier bandwidths, corresponding to the target UE category, where N is greater than or equal to 1.

The N carrier bandwidths may be all of the carrier bandwidths supported by the UE, or may be some of the carrier bandwidths supported by the UE.

Alternatively, the network device may indicate, to the UE, that the network device expects the UE to report a UE processing time, for each of the N carrier bandwidths, corresponding to the target UE category. The indication may be included in indication information, or may be included in other information.

For example, the UE may transmit the processing time information to the network device according to Table 2. Table 2 may be preconfigured for the UE by the network device. For example, the network device may indicate, by using the indication information, that the UE is expected to report the range of the combination of the carrier bandwidths and the target UE categories.

TABLE 2

| carrier bandwidth | Target UE category | UE processing time |
|---|---|---|
| bandwidth 1 | UE category i | |
| | . . . | |
| | UE category j | |
| bandwidth 2 | UE category m | |
| | . . . | |
| | UE category n | |
| . . . | . . . | . . . |

For another example, the UE may also transmit the processing time information to the network device according to Table 3. Table 3 may be preconfigured for the UE by the network device. For example, the network device may indicate, to the UE by using the indication information, that the UE is expected to report the range of the combination of the carrier bandwidths, the numerologies and the target UE categories. The UE reports, to the network device, the UE processing time, for each numerology under each carrier bandwidth supported by the UE, corresponding to the target UE category.

TABLE 3

| carrier bandwidth | Numerology | Target UE category | UE processing time |
|---|---|---|---|
| band1 | Numerology1 | UE category i | |
| | | . . . | |
| | | UE category j | |
| | Numerology2 | UE category m | |
| | | . . . | |
| | | UE category n | |
| | . . . | . . . | |
| band2 | Numerology1 | UE category i | |
| | | . . . | |
| | | UE category j | |

TABLE 3-continued

| carrier bandwidth | Numerology | Target UE category | UE processing time |
|---|---|---|---|
| | Numerology2 | UE category m ... UE category n | |
| ... | ... | ... | ... |

FIG. 3 shows a communication method 300 according to another embodiment of the disclosure. The method may be performed by a network device, the content of the method 300 shown in FIG. 3 that is the same as or similar to FIG. 2 may be seen from the related description of FIG. 2, which is not repeated herein. The method 300 includes the following operations.

At S301, a network device transmits an indication message to a UE, the indication message being configured to instruct the UE to report one or more UE processing times supported by the UE.

At S302, the network device receives processing time information from the UE, the processing time information indicating one or more UE processing times supported by the UE.

In the embodiments of the disclosure, the network device instructs the UE to report processing time information, the processing time information may indicate a UE processing time corresponding to a target parameter supported by the UE, so that the network device performs scheduling or other operations on a system based on the processing time information, thereby improving the communication performance.

Alternatively, in the method 300, the processing time information includes a minimum UE processing time supported by the UE.

Alternatively, in the method 300, the UE supports at least one UE processing time level, the at least one UE processing time level has a correspondence with at least one UE processing time range, and the processing time information includes at least one UE processing time level supported by the UE.

Alternatively, in the method 300, the processing time information includes a UE processing time level corresponding to a minimum UE processing time supported by the UE.

Alternatively, in the method 300, the communication method further includes that, the network device transmits notification information to the UE, the notification information indicating a correspondence between at least one UE processing time level and at least one UE processing time range.

Alternatively, in the method 300, the processing time information includes a UE processing time corresponding to a target parameter, the target parameter including at least one of the following parameters: a target UE category, a target numerology or a target carrier bandwidth, and the UE processing time being time required for data processing in case that the UE configures the target parameter.

Alternatively, in the method 300, the indication message includes first information configured to instruct the UE to report a UE processing time corresponding to the target parameter.

Alternatively, in the method 300, the processing time information includes a UE processing time corresponding to a combination of target parameters, the combination of target parameters including at least two of the following parameters: the target UE category, the target numerology, or the target carrier bandwidth.

Alternatively, in the method 300, the indication message includes second information, the second information being configured to instruct the UE to report a UE processing time corresponding to a UE category that is less than or equal to a highest UE category.

Alternatively, in the method 300, the target numerology includes M numerologies, and the processing time information includes a UE processing time, for each of the M numerologies, corresponding to the target UE category.

Alternatively, in the method 300, the target carrier bandwidth includes N carrier bandwidths, and the processing time information includes a UE processing time, for each of the N carrier bandwidths, corresponding to the target UE category.

The communication method according to the embodiment of the disclosure was introduced above in conjunction with FIG. 1 to FIG. 3. A UE and a network device according to the embodiment of the disclosure will be described in detail below in conjunction with FIG. 4 to FIG. 7.

Figure 4:
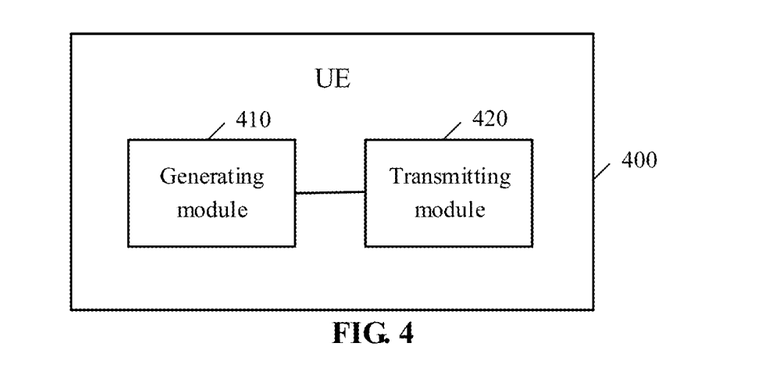
FIG. 4 is a schematic structure diagram of a UE according to an embodiment of the disclosure.

FIG. 4 illustrates a schematic block diagram of a UE according to an embodiment of the disclosure. The UE 400 shown in FIG. 4 includes a generating module 410 and a transmitting module 420.

The generating module 410 is configured to generate processing time information, the processing time information indicating one or more UE processing times supported by the UE.

The transmitting module 420 is configured to transmit the processing time information to a network device.

In the embodiments of the disclosure, the UE reports processing time information to the network device, the processing time information may indicate one or more UE processing times supported by the UE, so that the network device performs scheduling or other operations on a system based on the processing time information, thereby improving the communication performance.

Alternatively, the processing time information includes a minimum UE processing time supported by the UE.

Alternatively, the UE supports at least one UE processing time level, the at least one UE processing time level has a correspondence with at least one UE processing time range, and the processing time information includes at least one UE processing time level supported by the UE.

Alternatively, the processing time information includes a UE processing time level corresponding to a minimum UE processing time supported by the UE.

Alternatively, the UE further includes: a receiving module 430, configured to receive notification information from the network device, the notification information indicating a correspondence between at least one UE processing time level and at least one UE processing time range.

Alternatively, the UE further includes: a receiving module 430, configured to receive, before the generating module generates processing time information, an indication message from the network device, the indication message being configured to instruct the UE to report one or more UE processing times supported by the UE.

Alternatively, the processing time information includes a UE processing time corresponding to a target parameter, the target parameter being at least one of the following parameters: a target UE category, a target numerology or a target carrier bandwidth, and the UE processing time being time required for data processing in case that the UE configures the target parameter.

Alternatively, the UE further includes: a receiving module 430, configured to receive, before the generating module 410 generates processing time information, an indication message from the network device, the indication message including first information, the first information being configured to instruct the UE to report a UE processing time corresponding to the target parameter.

Alternatively, the processing time information includes a UE processing time corresponding to a combination of target parameters, the combination of target parameters including at least two of the following parameters: the target UE category, the target numerology, or the target carrier bandwidth.

Alternatively, the indication message includes second information, the second information being configured to instruct the UE to report a UE processing time corresponding to a UE category that is less than or equal to a highest UE category; and the generating module is specifically configured to: determine a UE category that is less than or equal to the highest UE category from UE categories supported by the UE; determine the UE category that is less than or equal to the highest UE category as the target UE category; and generate the processing time information according to a UE processing time corresponding to the target UE category.

Alternatively, the target numerology includes M numerologies, and the processing time information, for each of the M numerologies, includes a UE processing time corresponding to the target UE category.

Alternatively, the target carrier bandwidth includes N carrier bandwidths, and the processing time information includes a UE processing time, for each of the N carrier bandwidths, corresponding to the target UE category.

Figure 5:
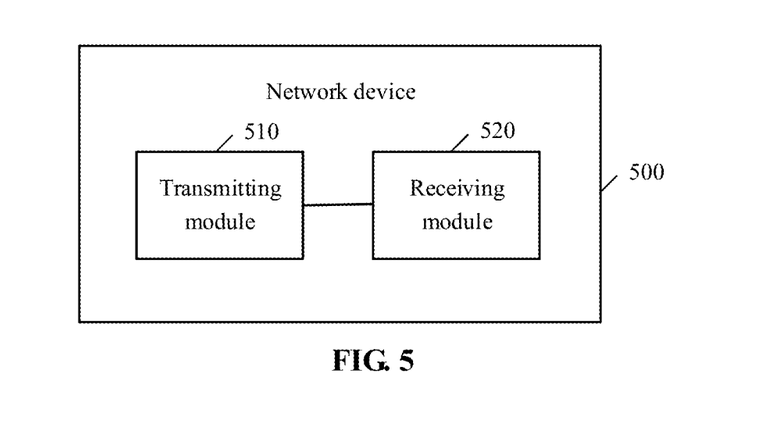
FIG. 5 is a schematic structure diagram of a network device according to an embodiment of the disclosure.

FIG. 5 illustrates a schematic block diagram of a network device according to an embodiment of the disclosure. A network device 500 shown in FIG. 5 includes a transmitting module 510 and a receiving module 520.

The transmitting module 510 is configured to transmit an indication message to a UE, the indication message being configured to instruct the UE to report one or more UE processing times supported by the UE.

The receiving module 520 is configured to receive processing time information from the UE, the processing time information indicating the UE processing time(s) supported by the UE.

In the embodiments of the disclosure, the network device instructs the UE to report processing time information, the processing time information may indicate one or more UE processing times supported by the UE, so that the network device performs scheduling or other operations on a system based on the processing time information, thereby improving the communication performance.

Alternatively, the processing time information includes a minimum UE processing time supported by the UE.

Alternatively, the UE supports at least one UE processing time level, the at least one UE processing time level has a correspondence with at least one UE processing time range, and the processing time information includes at least one UE processing time level supported by the UE.

Alternatively, the processing time information includes a UE processing time level corresponding to a minimum UE processing time supported by the UE.

Alternatively, the receiving module 510 is further configured to transmit notification information to the UE, the notification information indicating a correspondence between at least one UE processing time level and at least one UE processing time range.

Alternatively, the processing time information includes a UE processing time corresponding to a target parameter, the target parameter being at least one of the following parameters: a target UE category, a target numerology or a target carrier bandwidth, and the UE processing time being time required for data processing in case that the U E configures the target parameter.

Alternatively, the indication message includes first information configured to instruct the UE to report a UE processing time corresponding to the target parameter.

Alternatively, the processing time information includes a UE processing time corresponding to a combination of target parameters, the combination of target parameters including at least two of the following parameters: the target UE category, the target numerology, or the target carrier bandwidth.

Alternatively, the indication message includes second information, the second information being configured to instruct the UE to report a UE processing time corresponding to a UE category that is less than or equal to a highest UE category.

Alternatively, the target numerology includes M numerologies, and the processing time information, for each of the M numerologies, includes a UE processing time corresponding to the target UE category.

Alternatively, the target carrier bandwidth includes N carrier bandwidths, and the processing time information includes a UE processing time, for each of the N carrier bandwidths, corresponding to the target UE category.

Figure 6:
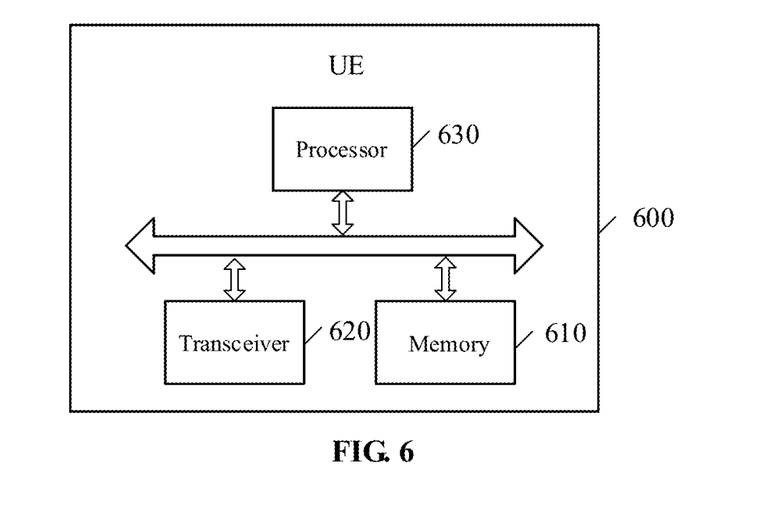
FIG. 6 is a schematic structure diagram of a UE according to yet another embodiment of the disclosure.

FIG. 6 illustrates a schematic block diagram of a UE according to an embodiment of the disclosure. A UE 600 shown in FIG. 6 includes a memory 610, a transceiver 620 and a processor 630.

The memory 610 is configured to store a program.

The transceiver 620 is configured to communicate with other devices.

The processor 630 is configured to execute the program in the memory 610, wherein when the program is executed, the processor 630 is configured to: generate processing time information, the processing time information indicating one or more UE processing times supported by the UE; and transmit the processing time information to a network device through the processor 630.

In the embodiments of the disclosure, a UE reports processing time information to a network device, wherein the processing time information may indicate one or more UE processing times supported by the UE, so that the network device performs scheduling or other operations on a system based on the processing time information, thereby improving the communication performance.

Alternatively, the processing time information includes a minimum UE processing time supported by the UE.

Alternatively, the UE supports at least one UE processing time level, the at least one UE processing time level has a correspondence with at least one UE processing time range, and the processing time information includes at least one UE processing time level supported by the UE.

Alternatively, the processing time information includes a UE processing time level corresponding to a minimum UE processing time supported by the UE.

Alternatively, the processor 630 is further configured to receive notification information from the network device through the transceiver 620, the notification information indicating a correspondence between at least one UE processing time level and at least one UE processing time range.

Alternatively, the processor 630 is further configured to receive, before generating processing time information, an indication message from the network device through the transceiver 620, the indication message being configured to instruct the UE to report one or more UE processing times supported by the UE.

Alternatively, the processing time information includes a UE processing time corresponding to a target parameter, the target parameter being at least one of the following parameters: a target UE category, a target numerology or a target carrier bandwidth, and the UE processing time being time required for data processing in case that the UE configures the target parameter.

Alternatively, the processor 630 is further configured to receive, before generating processing time information, an indication message from the network device through the transceiver 620, the indication message including first information, the first information being configured to instruct the UE to report a UE processing time corresponding to the target parameter.

Alternatively, the processing time information includes a UE processing time corresponding to a combination of target parameters, the combination of target parameters including at least two of the following parameters: the target UE category, the target numerology, or the target carrier bandwidth.

Alternatively, the indication message includes second information, the second information being configured to instruct the UE to report a UE processing time corresponding to a UE category that is less than or equal to a highest UE category; and the operation that the UE generates processing time information includes that: the UE determines a UE category that is less than or equal to the highest UE category from UE categories supported by the UE; the UE determines the UE category that is less than or equal to the highest UE category as the target UE category; and the UE generates the processing time information according to a UE processing time corresponding to the target UE category.

Alternatively, the target numerology is M numerologies, and the processing time information, for each of the M numerologies, includes a UE processing time corresponding to the target UE category.

Alternatively, the target carrier bandwidth is N carrier bandwidths, and the processing time information includes a UE processing time, for each of the N carrier bandwidths, corresponding to the target UE category.

Figure 7:
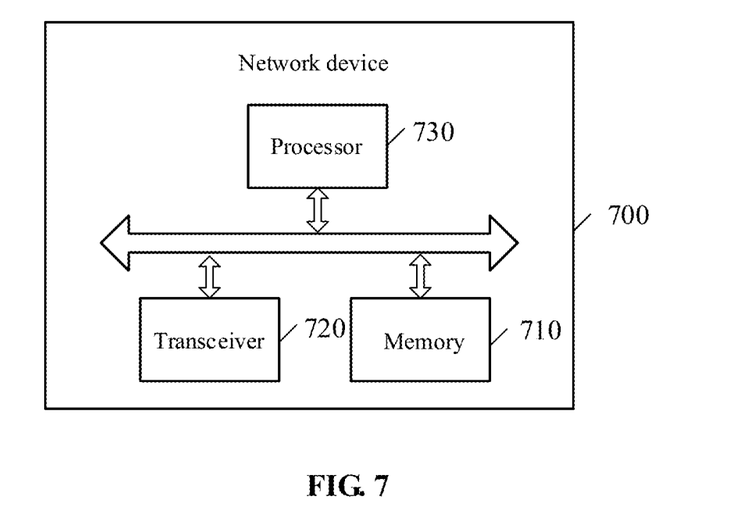
FIG. 7 is a schematic structure diagram of a network device according to yet another embodiment of the disclosure.

FIG. 7 illustrates a schematic block diagram of a network device according to an embodiment of the disclosure. A network device 700 shown in FIG. 7 includes a transmitting module 510 and a receiving module 520.

The memory 710 is configured to store a program.

The transceiver 720 is configured to communicate with other devices.

The processor 730 is configured to execute the program in the memory 710, wherein when the program is executed, the processor 730 is configured to: transmit an indication message to a UE through the transceiver 720, the indication message being configured to instruct the UE to report one or more UE processing times supported by the UE; and receive processing time information from the UE through the transceiver 720, the processing time information indicating one or more UE processing times supported by the UE.

In the embodiments of the disclosure, the network device instructs the UE to report processing time information, the processing time information may indicate one or more UE processing times supported by the UE, so that the network device performs scheduling or other operations on a system based on the processing time information, thereby improving the communication performance.

Alternatively, the processing time information includes a minimum UE processing time supported by the UE.

Alternatively, the UE supports at least one UE processing time level, the at least one UE processing time level has a correspondence with at least one UE processing time range, and the processing time information includes at least one UE processing time level supported by the UE.

Alternatively, the processing time information includes a UE processing time level corresponding to a minimum UE processing time supported by the UE.

Alternatively, the processor 730 is further configured to transmit notification information to the UE through the transceiver 720, the notification information indicating a correspondence between at least one UE processing time level and at least one UE processing time range.

Alternatively, the processing time information includes a UE processing time corresponding to a target parameter, the target parameter being at least one of the following parameters: a target UE category, a target numerology or a target carrier bandwidth, and the UE processing time being time required for data processing in case that the UE configures the target parameter.

Alternatively, the indication message includes first information configured to instruct the UE to report a UE processing time corresponding to the target parameter.

Alternatively, the processing time information includes a UE processing time corresponding to a combination of target parameters, the combination of target parameters including at least two of the following parameters: the target UE category, the target numerology, or the target carrier bandwidth.

Alternatively, the indication message includes second information, the second information being configured to instruct the UE to report a UE processing time corresponding to a UE category that is less than or equal to a highest UE category.

Alternatively, the target numerology is M numerologies, and the processing time information, for each of the M numerologies, includes a UE processing time corresponding to the target UE category.

Alternatively, the target carrier bandwidth is N carrier bandwidths, and the processing time information includes a UE processing time, for each of the N carrier bandwidths, corresponding to the target UE category.

In addition, the terms "system" and "network" are used interchangeably herein. The term "and/or" herein is merely an association describing associated objects, indicating that there may be three relationships. For example, A and/or B may indicate that A exists separately, both A and B exist, and B exists separately. In addition, the character "/" herein generally indicates that the contextual object is an "or" relationship.

It is to be understood that in the embodiment of the disclosure, "B corresponding to A" means that B is associated with A, and B can be determined from A. However, it is also to be understood that determining B from A does not mean that B is determined merely from A, and that B can also be determined from A and/or other information.

It is to be understood that in various embodiments of the disclosure, the size of the sequence numbers of the above processes does not mean the order of execution, and the order of execution of each process should be determined by its function and internal logic, and should not make any limitation to the implementation process of the embodiment of the disclosure.

It can be understood that the processor in the embodiment of the disclosure may be an integrated circuit chip with signal processing capability. In the implementation process, each step of the foregoing method embodiments may be completed by an integrated logic circuit of hardware in the processor or an instruction in the form of software. The processor may be a general-purpose processor, a Digital Signal Processor (DSP), an Application Specific Integrated Circuit (ASIC), a Field Programmable Gate Array (FPGA), or other programmable logic devices, discrete gates or transistor logic devices, discrete hardware components. The methods, steps, and logical block diagrams disclosed in the embodiments of the disclosure may be implemented or performed. The general purpose processor may be a microprocessor or the processor may also be any conventional processor or the like. The steps of the method disclosed in connection with the embodiments of the disclosure may be directly implemented as being completely performed by a hardware decoding processor, or completely performed by a combination of hardware and software modules in the decoding processor. The software module may be located in a mature storage medium in the field such as a random memory, a flash memory, a Read-Only Memory (ROM), a Programmable ROM (PROM) or an electrically erasable programmable memory, and a register. The storage medium is located in the memory, and the processor reads information in the memory and completes the steps of the above method in combination with hardware thereof.

It is to be understood that the memory in the embodiments of the disclosure may be a volatile memory or a non-volatile memory, or may include both a volatile memory and a non-volatile memory. The non-volatile memory may be a ROM, a PROM, an Erasable PROM (EPROM), or an Electrically EPROM (EEPROM) or a flash memory. The volatile memory may be a Random Access Memory (RAM) that acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memories of the systems and methods described herein are intended to include, but not limited to, these and any other suitable types of memories.

Those of ordinary skill in the art will appreciate that the units and algorithm steps of various examples described in combination with the embodiments disclosed herein can be implemented in electronic hardware or a combination of computer software and electronic hardware. Whether these functions are performed in the form of hardware or software depends on specific application and design constraints of the technical solution. Those skilled in the art can use different methods for implementing the described functions for each particular application, but such implementation should not be considered to be beyond the scope of the disclosure.

Those skilled in the art can clearly understand that for the convenience and brevity of the description, the specific working process of the system, apparatus and unit described above may be seen from the corresponding process in the foregoing method embodiment, and details are not described herein again.

In several embodiments provided by the present application, it is to be understood that the disclosed system, apparatus and method may be implemented in other manners. For example, the apparatus embodiments described above are merely illustrative. For example, the division of the unit is only a logical function division. In actual implementation, there may be another division manner. For example, multiple units or components may be combined or may be integrated into another system, or some features may be ignored or not executed. In addition, coupling or direct coupling or communication connection displayed or discussed may be indirect coupling or communication connection between apparatuses or units through some interfaces, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the disclosure may be integrated into one processing unit, or each unit may exist physically separately, or two or more units may be integrated into one unit.

The functions may be stored in a computer-readable storage medium if being implemented in the form of a software functional unit and sold or used as a standalone product. Based on such understanding, the essence of the technical solution of the disclosure or a part contributing to the prior art or a part of the technical solution may be embodied in the form of a software product, which is stored in a storage medium, including a plurality of instructions used to cause a computer device (which may be a personal computer, server, or network device, etc.) to perform all or part of the steps of the methods described in various embodiments of the disclosure. The foregoing storage medium includes: various media capable of storing program codes, such as a U disk, a mobile hard disk, a ROM, a RAM, a magnetic disk, or an optical disc.

The above is only the specific implementation manner of the disclosure, but the scope of protection of the disclosure is not limited thereto. Any person skilled in the art can easily think of changes or replacements within the technical scope disclosed by the disclosure, which should be covered by the scope of protection of the disclosure. Therefore, the scope of protection of the disclosure should be determined by the scope of protection of the claims.

The invention claimed is:

1. A communication method, comprising:
generating, by a User Equipment (UE), processing time information, the processing time information indicating one or more UE processing times supported by the UE; and
transmitting, by the UE, the processing time information to a network device;
wherein the processing time information comprises a UE processing time corresponding to a target parameter, the target parameter including at least one of the following parameters: a target UE category, a target numerology or a target carrier bandwidth, and the UE processing time being time required for data processing in case that the UE configures the target parameter;
wherein the target numerology comprises M numerologies, and the processing time information comprises a UE processing time, for each of the M numerologies, corresponding to the target UE category, and wherein the target carrier bandwidth comprises N carrier bandwidths, and the processing time information comprises a UE processing time, for each of the N carrier bandwidths, corresponding to the target UE category;
wherein the UE processing time is time for preparing data uplink transmission after the UE receives an uplink scheduling instruction of the network device.

2. The communication method of claim 1, wherein the processing time information comprises a minimum UE processing time supported by the UE.

3. The communication method of claim 1, wherein the UE supports at least one UE processing time level, the at least one UE processing time level has a correspondence with at least one UE processing time range, and the processing time information comprises the at least one UE processing time level supported by the UE.

4. The communication method of claim 3, wherein the processing time information comprises a UE processing time level corresponding to a minimum UE processing time supported by the UE.

5. A User Equipment (UE), comprising:
a memory, configured to store a program;
a transceiver, configured to communicate with other devices; and
a processor, configured to execute the program in the memory, wherein when the program is executed, the processor is configured to:
generate processing time information, the processing time information indicating one or more UE processing times supported by the UE; and
transmit the processing time information to a network device through the transceiver;
wherein the processing time information comprises a UE processing time corresponding to a target parameter, the target parameter including at least one of the following parameters: a target UE category, a target numerology or a target carrier bandwidth, and the UE processing time being time required for data processing in case that the UE configures the target parameter;
wherein the target numerology comprises M numerologies, and the processing time information comprises a UE processing time, for each of the M numerologies, corresponding to the target UE category, and wherein the target carrier bandwidth comprises N carrier bandwidths, and the processing time information comprises a UE processing time, for each of the N carrier bandwidths, corresponding to the target UE category;
wherein the UE processing time is time for preparing data uplink transmission after the UE receives an uplink scheduling instruction of the network device.

6. The UE of claim 5, wherein the processing time information comprises a minimum UE processing time supported by the UE.

7. The UE of claim 5, wherein the UE supports at least one UE processing time level, the at least one UE processing time level has a correspondence with at least one UE processing time range, and the processing time information comprises the at least one UE processing time level supported by the UE.

8. The UE of claim 7, wherein the processing time information comprises a UE processing time level corresponding to a minimum UE processing time supported by the UE.

9. The UE of claim 7, wherein the transceiver is further configured to receive notification information from the network device, the notification information indicating the correspondence between the at least one UE processing time level and the at least one UE processing time range.

10. The UE of claim 5, wherein the transceiver is further configured to receive, before the generating module generates processing time information, an indication message from the network device, the indication message being configured to instruct the UE to report one or more UE processing times supported by the UE.

11. The communication method of claim 1, wherein the numerology comprises subcarrier spacing.

12. The UE of claim 5, wherein the numerology comprises subcarrier spacing.

* * * * *